April 17, 1945.  H. M. MARTIN  2,374,028
DYNAMOELECTRIC MACHINE
Filed Sept. 29, 1943
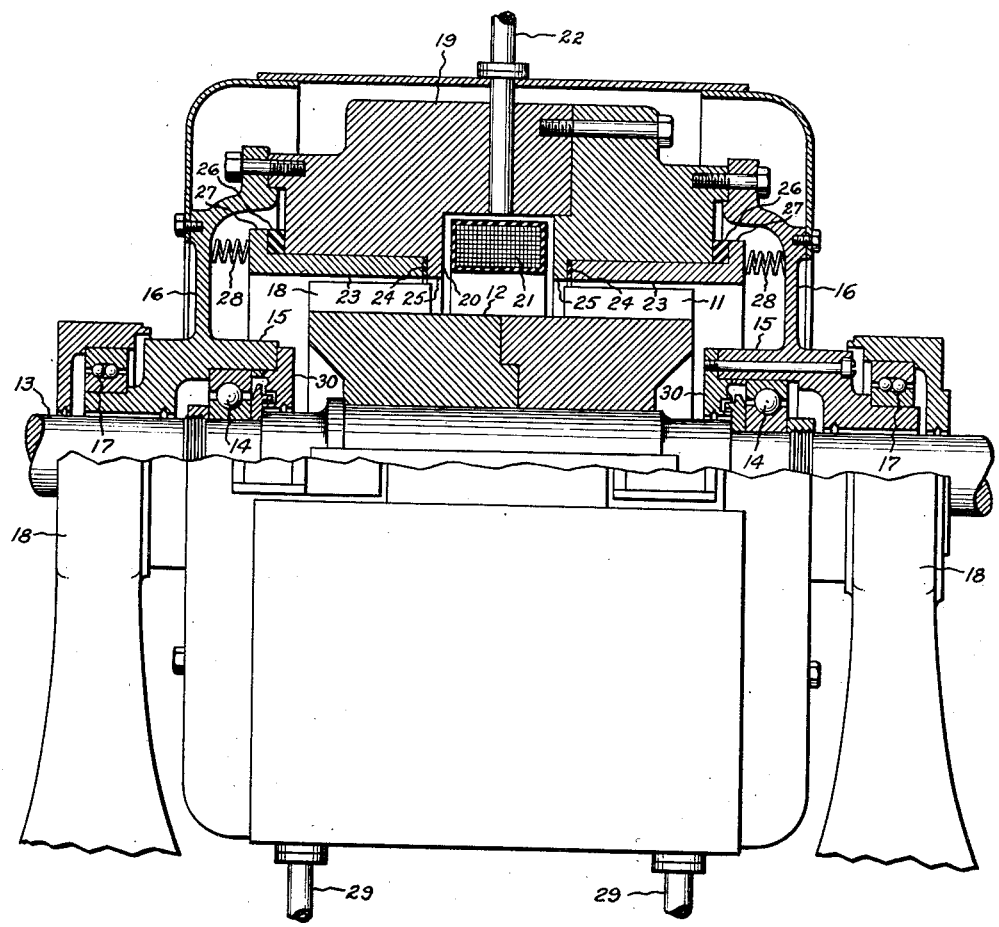
Inventor:
Harold M. Martin,
by Harry E. Dunham
His Attorney.

Patented Apr. 17, 1945

2,374,028

UNITED STATES PATENT OFFICE 2,374,028

DYNAMOELECTRIC MACHINE

Harold M. Martin, Schenectady, N. Y., assignor to General Electric Company, a corporation of New York Application September 29, 1943, Serial No. 504,272

7 Claims. (Cl. 171—252)

This invention relates to dynamoelectric machines and particularly to an improvement in such a machine when cooling liquid is adapted to be circulated in direct contact with surfaces of the relatively movable members of the machine.

In machines of this type, the flow of cooling liquid in contact with the surfaces of the relatively rotatable members of the machine tends to corrode or otherwise erode the surfaces of the machine which requires the replacement of these members.

In my improved construction, a removable protective sleeve is arranged for contact with the cooling liquid such that the main portion of the members of the machine will not be harmfully affected by the flow of the cooling liquid, and any damage resulting from the flow of this liquid in contact with parts of the machine will be minimized.

An object of my invention is to provide an improved dynamoelectric machine in which cooling liquid is adapted to flow through the air gap between two relatively rotatable members of the machine.

Another object of my invention is to provide an improved dynamoelectric machine with an arrangement for minimizing the wear on the main parts of the machine due to the passage of cooling liquid in contact with these parts of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a side elevational view, partly in section, of a dynamoelectric machine of the inductor eddy current dynamometer type provided with an embodiment of my invention.

Referring to the drawing, I have shown a dynamoelectric machine of the inductor eddy current dynamometer type provided with a pair of relatively rotatable members, one of which is provided with two axially spaced apart toothed sections 10 and 11 which are provided with a reduced diameter waist portion 12 of sections 10 and 11. These members 10 and 11 are formed of magnetic material and are mounted on a shaft 13 which is rotatably supported at each end thereof by bearings 14 in bearing housings 15 formed in end shields 16 of the other member. These bearing housings 15 are in turn rotatably supported by bearings 17 in pedestals 18. The other member includes a main section 19 formed of two bolted-together parts made of magnetic material and provided with an annular recess 20 in which an exciting winding 21 is supported which is adapted to excite the two relatively rotatable members magnetically so that rotation of the toothed member will induce eddy currents in the other relatively rotatable member. As shown in the drawing, this winding is suitably insulated to provide for retaining and segregating the winding from the water in the surrounding space.

In order to cool the machine, cooling liquid is adapted to be supplied thereto through an inlet 22 and the cooling liquid is adapted to flow around the exciting winding 21 to cool the same and outwardly through an air gap between the tooth faces of the toothed member and the other relatively rotatable member. In order to minimize rusting, erosion, and other wear by the cooling liquid of the member 19, I provide a sleeve 23 at each end of the member 19 which covers substantially the entire inner cylindrical surface of the member and provides a removable protective lining which can be renewed whenever it becomes excessively rusted or otherwise worn. These sleeves 23 are formed of electrically conductive magnetic material and are arranged with a relatively good fit in the member 19 to minimize the air gap between the sleeve and the member 19 so as to minimize the reluctance of the magnetic path through this member. Furthermore, a gasket 24 is arranged between the inner end of the member 23 and a flange 25 on the member 19, and another gasket 26 is arranged between a flange 27 on the sleeve 23 and adjacent part of the member 19. A plurality of circumferentially spaced apart compression springs 28 are arranged between the end shields 16 and the outer ends of the sleeves 23 for resiliently biasing the sleeves towards the gaskets 24 and 26 and towards the adjacent parts of the member 19 for sealing the space between the sleeves 23 and the member 19 against the entrance of cooling liquid therebetween. This arrangement substantially prevents the entrance of cooling liquid into contact with the surface of the member 19 which engages the sleeve 23 and thereby prevents rusting of this surface. The cooling liquid is adapted to flow outwardly in the air gap between the sleeves 23 and the tooth faces of the toothed sections 10 and 11 into the interior of the machine and this liquid is then drained from the outer member of the machine through suitable drain pipes 29. Labyrinth seals 30 are arranged about the shaft 13 to minimize the flow of cooling liquid along the shaft towards the bearings 14, so as to prevent damage to these bearings by the cooling liquid.

In this manner, I have provided for efficiently cooling the eddy current surface of an inductor machine by the passage of cooling liquid directly in contact with the eddy current surface which is formed by the sleeves 23 and, in addition, provision has been made for an inexpensive and readily replaceable wearing member which will minimize the necessity for replacement of the main part of the machine due to the wearing effects of the cooling liquid.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A dynamoelectric machine having a pair of relatively rotatable members with an air gap therebetween, means for supplying cooling liquid for passage through the air gap between said relatively rotatable members and in contact with said members, means including a removable sleeve of electrically conductive material arranged on one of said members and forming substantially one side of the air gap with means for substantially sealing the adjacent surface of said one member from said cooling liquid, and means removably securing said sleeve in position.

2. A dynamoelectric machine having a pair of relatively rotatable members, one of said members having a toothed section of magnetic material, the other of said members being of magnetic material and arranged adjacent the tooth faces of said toothed member with an air gap therebetween, means including an exciting winding for magnetically exciting said relatively rotatable members, means for supplying cooling liquid for passage through the air gap between said relatively rotatable members and in contact with said members, and said other member having means including a removable sleeve of electrically conductive material arranged thereon with means for resiliently biasing said sleeve toward sealing surfaces of said other member and forming substantially one side of the air gap between said other member and said tooth faces.

3. A dynamoelectric machine having a pair of relatively rotatable members, one of said members having a toothed section of magnetic material, the other of said members being of magnetic material and arranged adjacent the tooth faces of said toothed member with an air gap therebetween, means for supplying cooling liquid for passage through the air gap between said relatively rotatable members and in contact with said members, said other member having means including a sleeve of electrically conductive material arranged thereon and forming substantially one side of the air gap between said other member and said tooth faces and having means for substantially preventing the entrance of cooling liquid between said sleeve and said other member, and means for resiliently biasing said sleeve into position.

4. A dynamoelectric machine having a pair of relatively rotatable members, one of said members having toothed sections of magnetic material, the other of said members being of magnetic material and arranged adjacent the tooth faces of said toothed member with an air gap therebetween, means for supplying cooling liquid for passage through the air gap between said relatively rotatable members, said other member having means including a sleeve arranged thereon and forming one side of the air gap between said other member and said tooth faces and having sealing means for preventing the entrance of cooling liquid between said sleeve and the adjacent part of said other member, and means for removably securing said sleeve in position.

5. A dynamoelectric machine having a pair of relatively rotatable members, one of said members having toothed sections of magnetic material, the other of said members being of magnetic material and arranged adjacent the tooth faces of said toothed member with an air gap therebetween, means including an exciting winding for magnetically exciting said relatively rotatable members, means for supplying cooling liquid for passage through the air gap between said relatively rotatable members, said other member having means including a removable sleeve arranged thereon and forming one side of the air gap between said other member and said tooth faces arranged to prevent the entrance of cooling liquid between said sleeve and the adjacent part of said member, and means for resiliently biasing said sleeve into position.

6. A dynamoelectric machine having a pair of relatively rotatable members, one of said members having two axially spaced apart toothed sections of magnetic material, the other of said members being of magnetic material and arranged adjacent the tooth faces of said toothed member with an air gap therebetween, means including an exciting winding for magnetically exciting said relatively rotatable members, means for supplying cooling liquid for passage through the air gap between said relatively rotatable members, said other member having means including a removable sleeve of magnetic material arranged thereon and forming a part of one side of the air gap between said other member and said tooth faces and having sealing gaskets for preventing the entrance of cooling liquid between said sleeve and the adjacent part of said other member, and means for removably securing said sleeve in position.

7. A dynamoelectric machine having a pair of relatively rotatable members, one of said members having a toothed section of magnetic material, the other of said members being of magnetic material and arranged adjacent the tooth faces of said toothed member with an air gap therebetween, means including an exciting winding for magnetically exciting said relatively rotatable members, means for supplying cooling liquid for passage through the air gap between said relatively rotatable members and in contact with said members, said other member having means including a removable sleeve arranged thereon and forming substantially one side of the air gap between said other member and said tooth faces, and means including sealing gaskets adjacent the ends of said sleeve, and means for resiliently biasing said sleeve toward said gaskets and toward the adjacent part of said other member for sealing against the entrance of cooling liquid between said sleeve and the adjacent part of said other member.

HAROLD M. MARTIN.